(12) United States Patent
Kacak

(10) Patent No.: US 6,305,119 B1
(45) Date of Patent: Oct. 23, 2001

(54) FISHING LURE RETRIEVER

(76) Inventor: Joseph W. Kacak, 1162 Milburn Ct., Naperville, IL (US) 60540

( * ) Notice: Subject to any disclaimer, the term of this patent is extended or adjusted under 35 U.S.C. 154(b) by 0 days.

(21) Appl. No.: 09/531,920

(22) Filed: Mar. 21, 2000

(51) Int. Cl.$^7$ .................................................. A01K 97/24
(52) U.S. Cl. .......................... 43/17.2; 294/19.1; 294/66.1
(58) Field of Search .................... 294/19.1, 19.2, 294/66.1; 24/598.3, 600.5, 908; 43/5, 17.2, 53.5

(56) References Cited

U.S. PATENT DOCUMENTS

| | | |
|---|---|---|
| 2,083,814 | 6/1937 | Bence . |
| 2,165,245 | 7/1939 | Eastman . |
| 2,353,357 | 7/1944 | Paulick . |
| 2,758,406 | 8/1956 | Childress . |
| 2,760,810 * | 8/1956 | Smith ................................. 294/66.1 |
| 2,866,290 | 12/1958 | Karry . |
| 2,906,050 | 9/1959 | Foster . |
| 2,950,558 | 8/1960 | Karpes . |
| 3,628,279 * | 12/1971 | Halone ................................. 43/17.2 |
| 3,735,521 | 5/1973 | Krylov . |
| 4,086,718 * | 5/1978 | Swanson et al. ..................... 43/17.2 |
| 4,155,190 * | 5/1979 | McInturff et al. ..................... 43/17.2 |
| 5,628,538 * | 5/1997 | Ericksen ............................. 294/19.1 |

OTHER PUBLICATIONS

Bass Pro Shops, Hound Dog Lure Retriever, *1999 Master Catalog*, p. 254 (Approximately Jan. 31, 1999).
Bass Pro Shops, Telescopic Lure Retriever, *1999 Master Catalog*, p. 254 (Approximately Jan. 31, 1999).
Bass Pro Shops, Golden Retriever, *1999 Master Catalog*, p. 254 (Approximately Jan. 31, 1999).
Bass Pro Shops, Lure Retriever, *1999 Master Catalog*, p. 254 (Approximately Jan. 31, 1999).
Bass Pro Shops, Gripper Lure Retriever, *1999 Master Catalog*, p. 254 (Approximately Jan. 31, 1999).

* cited by examiner

Primary Examiner—Johnny D Cherry
(74) Attorney, Agent, or Firm—Leydig, Voit & Mayer, Ltd.

(57) ABSTRACT

A fishing lure retriever is provided that utilizes a ring member to selectively encircle the fishing line of a snagged lure and is caused to track along the line until the ring member contacts the fishing lure, whereupon further advancement of the retriever towards the fishing lure causes the ring member to rotate and urge the lure out of its snagged condition.

11 Claims, 4 Drawing Sheets

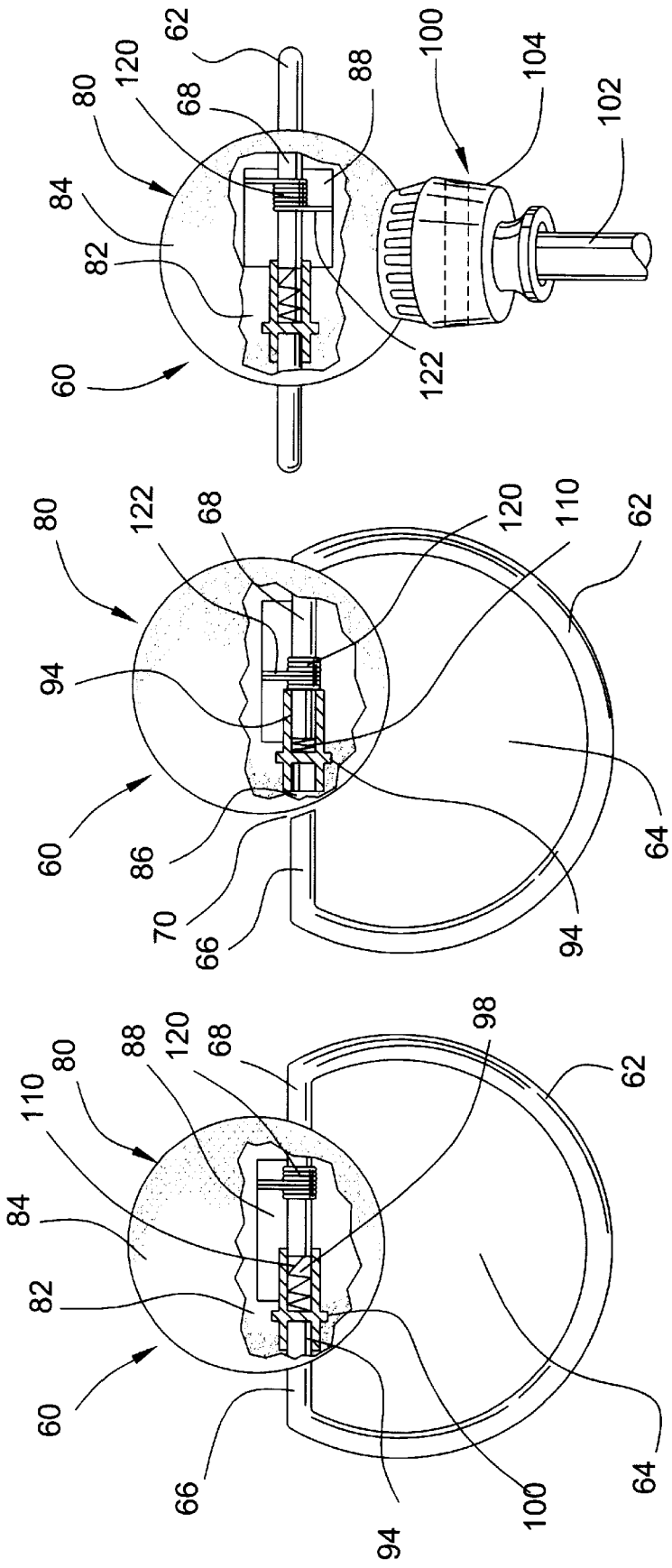

US 6,305,119 B1

FISHING LURE RETRIEVER

FIELD OF THE INVENTION

The present invention relates to fishing lure retrievers for urging lures from snagged conditions.

BACKGROUND OF THE INVENTION

A frequent problem when fishing is the tendency of fishing lures to entangle obstructions within the water, including submerged tree branches, surface brush, rocks, debris and the like. In many instances the lure is lost because either the fishing line snaps when attempting to disengage the lure from the obstruction or the fisherman concludes that the lure cannot be retrieved and resorts to cutting the line.

Over the years, various attempts have been made to address this recurring problem. Prior art devices have proven largely ineffective in conveniently retrieving a satisfactory percentage of the snagged lures. Most of the fishing lure retrievers on the market today provide a mechanism for attaching to the fishing line of a snagged lure, where the line serves to guide the device to the snagged lure. These attaching mechanisms, however, are often cumbersome to operate and/or are susceptible to breaking the fishing line during use. Other devices are simply ineffective in extricating the fish hooks from the obstruction or require precise manipulation in conditions of poor or zero visibility. In this regard, some retrievers only serve to disentangle the lure if the retriever approaches the lure from a particular angle and direction under circumstances in which the operator may not be able to visually determine the proper angle and direction. Moreover, many retrievers have a tendency to themselves become entangled with the fishing line.

To date, the industry has failed to afford an economical and reliable means of retrieving entangled fishing lures. Thus, it would be desirable to have a device which may be quickly and easily used to retrieve a high percentage of lures from their snagged condition.

OBJECTS OF THE INVENTION

Accordingly, a general object of the present invention is to provide a fishing lure retriever which overcomes the deficiencies of the prior art.

A more specific object of the present invention is to provide a fishing lure retriever that easily attaches to a fishing line.

Another object of the present invention is to provide a fishing lure retriever which is not susceptible to damaging or entangling the fishing line during use.

A further object of the present invention is to provide a fishing lure retriever that is effective in disentangling a lure from a variety of obstructions and approach angles.

Yet a further object of the present invention is to provide a fishing lure retriever that is of simple and economical construction.

SUMMARY OF THE INVENTION

A fishing lure retriever is provided that effectively disentangles a lure from a variety of obstructions and approach angles. Specifically, the retriever utilizes a main body with a resiliently pivoting ring member to selectively encircle the fishing line of a snagged lure. Once the ring member is encircling the line, the retriever is caused to track along the line using an elongated pole until the ring member contacts the fishing lure, whereupon further advancement of the retriever towards the fishing lure causes the ring member to rotate and urge the lure out of its snagged condition. This configuration and method of operation has been found to be effective in conveniently removing a high percentage of snagged lures.

These and other objects, features, and advantages of the present invention will become more readily apparent upon reading the following detailed description of exemplified embodiments and upon reference to the accompanying drawings herein.

BRIEF DESCRIPTION OF THE DRAWINGS

FIG. 3 is a front view of the fishing lure retriever of FIG. 2 with a section of the retriever body being broken away to reveal the internal components of one embodiment of the retrieval head;

FIG. 4 is a view similar to FIG. 3 with the ring member shifted laterally to the left to access a slot which permits the ring member to surround a fishing line;

FIG. 5 is a top view of the fishing lure retriever of the present invention with a section of the retriever body being broken away to reveal the internal components of the retrieval head.

DESCRIPTION OF THE EMBODIMENTS

Figure 1:
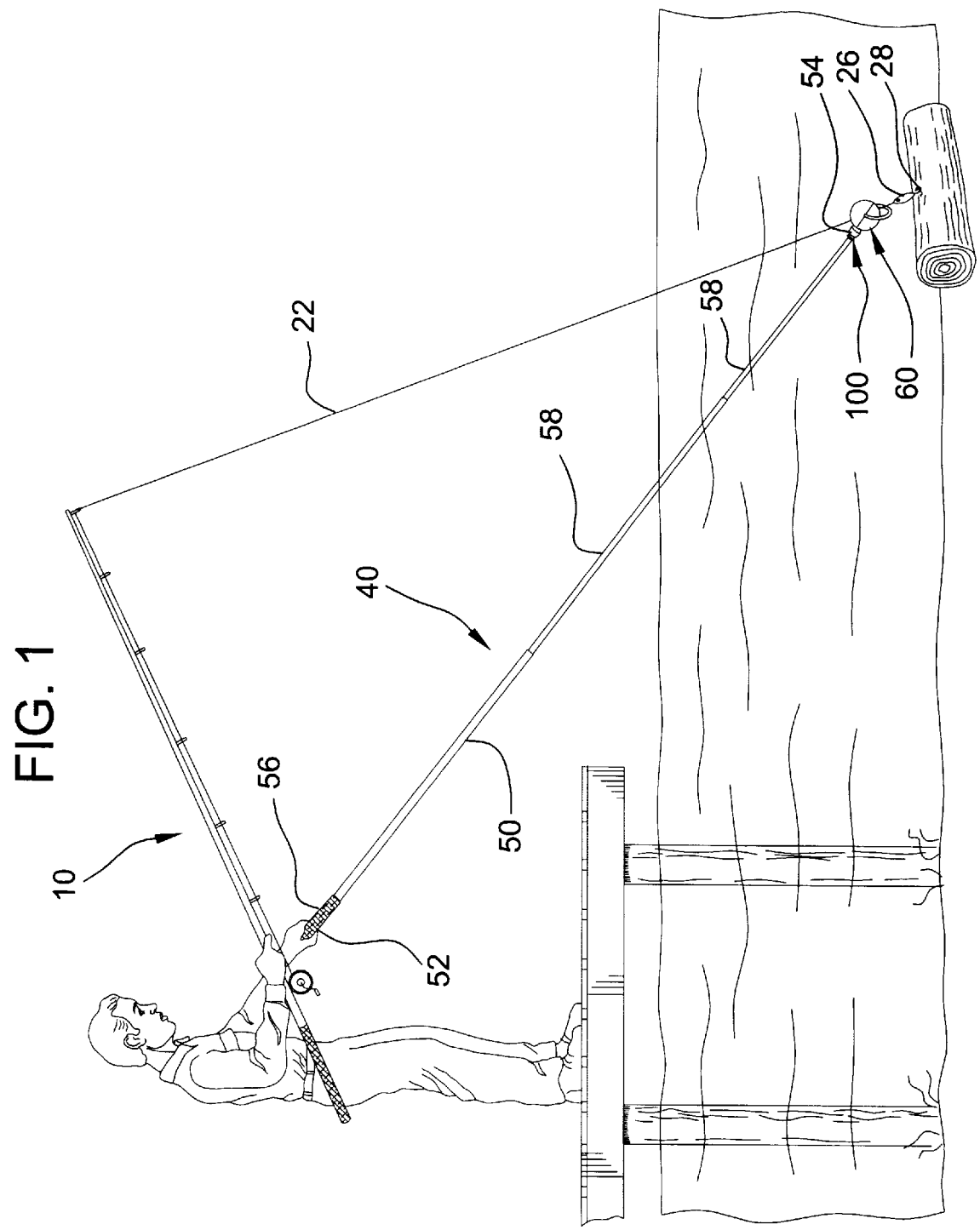
FIG. 1 is a perspective view of a person using a fishing lure retriever of the present invention to retrieve a snagged lure.

Turning now to the drawings, FIG. 1 illustrates a person using a fishing apparatus 10 and the fishing lure retriever 40 of the present invention. The fishing apparatus 10 utilizes a fishing line 22 to which a snagged fishing lure 26 with hooks 28 is attached. The fishing lure retriever 40 is advantageously used to selectively encircle the fishing line 22 of a snagged lure 26. Once attached to the fishing line 22, the retriever 40 is caused to track along the line 22 until the retriever 40 contacts the fishing lure 26, whereupon further advancement of the retriever 40 towards the lure 26 causes the retriever 40 to urge the lure 26 out of its snagged condition.

The fishing lure retriever 40 includes a pole 50, a retrieval head 60 and a connector 100. As illustrated in FIG. 1, the pole 50 has a proximal end 52 and a distal end 54 where the proximal end 52 provides a handle 56. The pole 50 is comprised of multiple telescopically extendible sections 58, which permit the length of the pole 50 to be extended as needed. Alternatively, the pole 50 may have multiple interlocking sections which may be added or removed as desired for any given application. The pole 50 is preferably made of an aluminum alloy or any other lightweight material of suitable strength as is known in the art. The handle 56 of the pole is preferably made of a resilient plastic or rubber material and may provide a shape which easily conforms to the grip of a human hand. Additionally, the handle 56 may include an embossed or dimpled pattern to enhance the gripping surface of the handle during operation.

Figure 2:
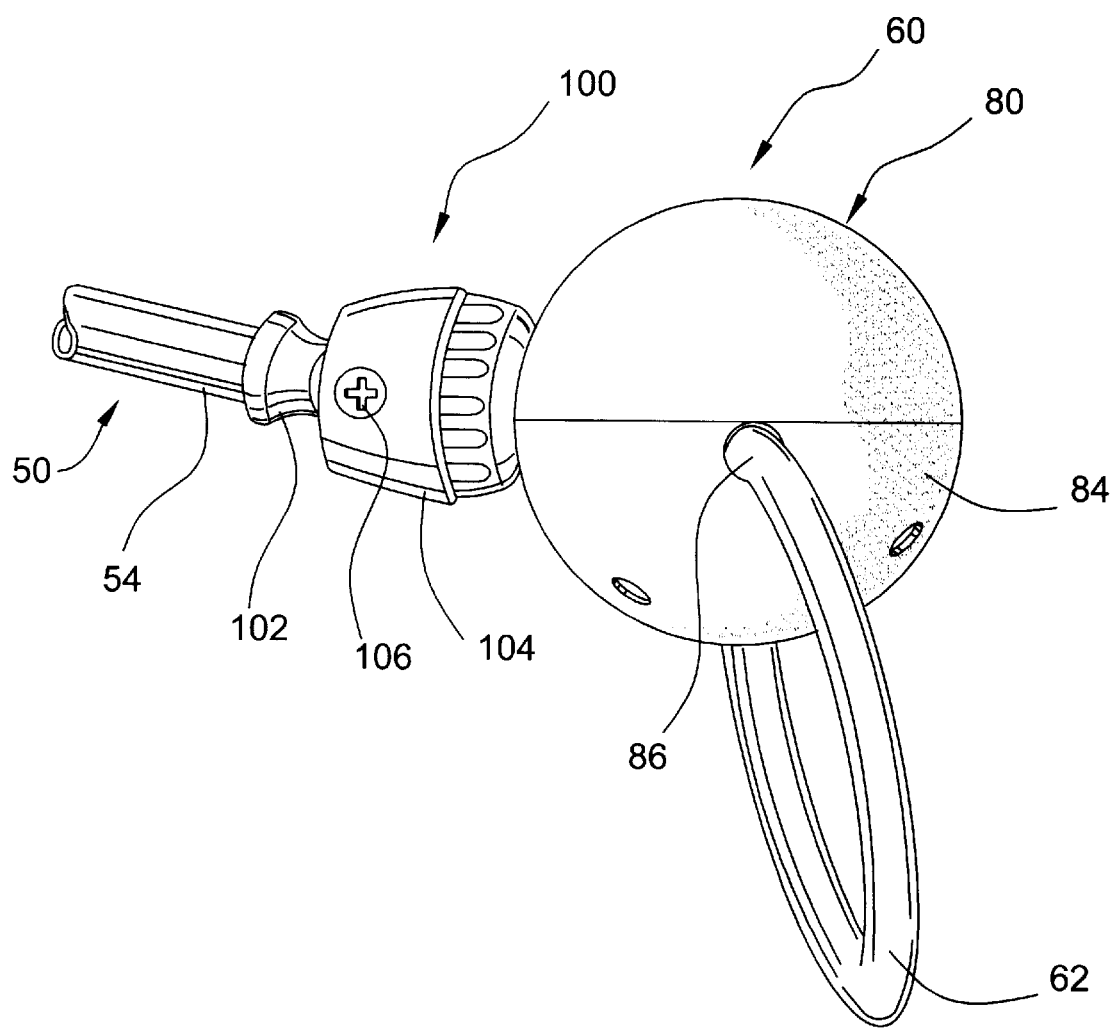
FIG. 2 is an enlarged perspective view of one embodiment of the fishing lure retriever of the present invention.

As seen in FIG. 2, the connector 100 of the retriever 40 comprises a ball portion 102 and socket portion 104 which provide swiveling attachment of the retrieval head 60 to the distal end 54 of the pole. The ball portion 102 of the connector 100 fits partially within the distal end 54 of the pole 50 and is attached thereto by any suitable means, including screws, pins, adhesives or threaded interlocking connections. The socket portion 104 of the connector is attached to the outer surface of the retrieval head 60 by similar means. The ball portion 102 of the connector 100 fits within and is pivotally secured to the socket portion 104 by a pin 106. Thus, during use, the retrieval head 60 may rotate in relation to the pole 50 about the pin 106. It will be appreciated by those of skill in the art that any number of connectors may be employed to achieve swiveling attachment between the pole 50 and the retrieval head 60.

Referring to FIGS. 2–5, the retrieval head 60 of the fishing lure retriever 10 comprises a ring member 62 and a body 80. The ring member 62 is generally circular with a central opening 64 sufficiently large to encircle a fishing lure and includes inwardly extending ends 66, 68 which terminate in opposed relation to form a slot 70. While the ring member 62 may be fabricated using materials that are known in the art, stainless steel is particularly desirable due to its strength and corrosion resistance.

The body 80 of the retrieval head 60 is substantially spherical in shape and includes a base 82 and a cap 84 which are preferably secured together by a pair of stainless steel screws (not shown), although any number of attachment means may be employed. The body 80 of the present invention may be readily fabricated from materials that are known in the art. For example, the body 80 may be injection molded from any number of thermoplastic materials.

A channel 86 is disposed through the body 80 between the base 82 and the cap 84 and is in communicating relation with an internal cavity 88 housed by the base 82 and the cap 84. The channel 86 is dimensioned to receive the first and second inwardly extending ends 66, 68 of the ring member 62. Fixedly disposed within the channel 86 is a generally cylindrical bushing 94 that is separated into an exterior receptacle 96 and an interior receptacle 98 by a wall 100 perpendicular to the longitudinal axis of the bushing 94. The exterior receptacle 96 of the bushing 94 is adapted to rotatingly and slidingly receive the first inwardly extending end 66 of the ring member 62, while the interior receptacle 98 of the bushing 92 is adapted to rotatingly and slidingly receive the second inwardly extending end 68 of the ring member 62.

Positioned within the interior receptacle 98 of the bushing 94 between the perpendicular wall 100 of the bushing 94 and the second inwardly extending end 68 of the ring member 62 is a compression spring 110 which provides a lateral biasing force against the ring member 62 to position the slot 70 of the ring member completely within the body 80 of the retrieval head 60. In this regard, when the ring member 62 is urged in a lateral direction along the axis of the first and second inwardly extending ends 66, 68 against the biasing force of the compression spring 110, the second inwardly extending end 68 of the ring member 62 slides further within the interior receptacle 98 of the bushing 94 and the slot 70 of the ring member 62 becomes exposed as shown in FIG. 4. When the ring member 62 is released from this position, the compression spring 110 forces the ring member 62 back to a position where the slot 70 of the ring member is completely within the body 80 of the retrieval head 60 and the first inwardly extending end 66 of the ring member is forced within the exterior receptacle 98 of the bushing 94 against the perpendicular wall 100 as illustrated in FIG. 3.

A torsion spring 120 having arms 122 is mounted on the second inwardly extending end 68 of the ring member 62 and is positioned within the cavity 88 of the body 80 to prevent the arms 122 of the torsion spring 120 from rotating. The torsion spring 120 thus provides a rotational biasing force to the ring member 62 relative to the body 80 of the retrieval head 60. In the relaxed or neutral position of the torsion spring 120, the ring member 62 is positioned substantially perpendicular to the pole 40 as best seen in FIG. 2. When the ring member 62 is urged rearwardly towards the pole 40, the ring member 62 rotates about the channel 86 and against the rotational biasing force of the torsion spring 120. Once the urging force against the ring member 62 is removed, the torsion spring 120 forces the ring member 62 to its relaxed position. The cavity 88 is dimensioned to permit the torsion spring 120 to slide laterally with the inwardly extending end of the ring member 62, as seen when comparing the position of the torsion spring in FIG. 3 to that of FIG. 4.

In another embodiment of the present invention, the slot 70 of the ring member may be accessed by providing a ring member 62 of flexible construction such that no compression spring 110 is utilized. In this embodiment, the ring member 62 resiliently bends in a lateral direction to provide access to the slot 70. Similarly, the ring member 62 of the present invention may provide rotational flexibility without the use of the torsion spring 120. As such, the ring member 62 is fixedly attached to the body 80 of the retriever 40, and instead of pivoting about the channel 86 of the body 80, the periphery of the ring member 62 flexibly rotates relative to the body 80. The construction of such a resilient ring member 62 would necessarily utilize a plastic or rubber material that provides sufficient rigidity during operation, but also allows the ring member 62 to be suitably bent without causing permanent deformation to the ring member 62.

The fishing lure retriever 40 of the present invention is advantageously used when the hooks 28 of a fishing lure 26 are entangled in an obstruction, such as a tree branch submerged in water. In use, the preferred embodiment of the fishing lure retriever 40 is attached to the fishing line 22 of the fishing apparatus 10 by simply pulling the ring member 62 laterally away from the body against the spring biasing force of the compression spring 110 to a point where the slot 70 of the ring member 62 is exposed. The fishing line 22 is then threaded through the slot 70 of the ring member 62 at which point the ring member 62 is released to its relaxed position.

Figure 6:
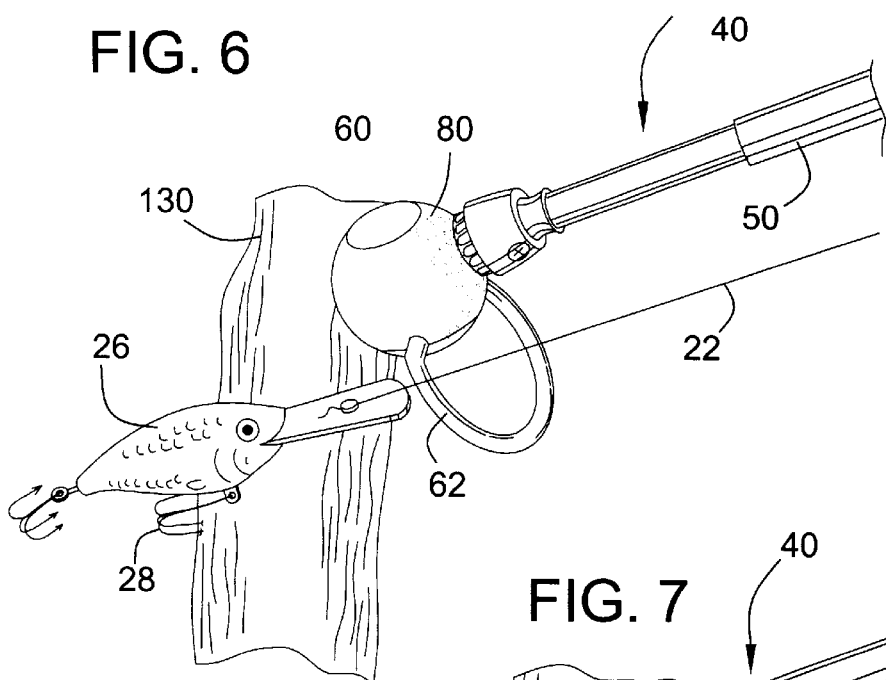
FIGS. 6–8 are successive perspective views of the fishing lure retriever of FIG. 2 as it is advanced toward, engages, and releases a snagged fishing lure.
Figure 7:
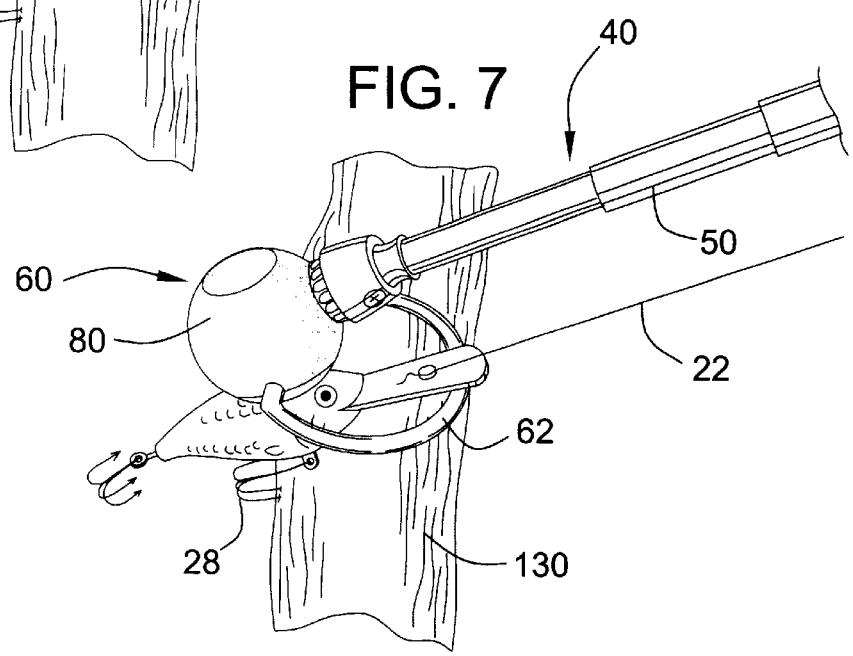

At this juncture, the fishing line 22 is enclosed between the ring member 62 and the body 80. As the operator holds the fishing apparatus 10 in one hand and the handle 56 of the retriever 40 in the other, the retrieval head 60 of the retriever 40 may be placed into the water. Ideally, the retrieval head 60 and pole 50 will be nearly neutrally buoyant, so that the retriever 40 may be guided by the fishing line 22 without significant effort on the part of the operator. The retriever 40 will track along the fishing line 22 toward the fishing lure 26 as illustrated in FIG. 6. Ultimately, the retrieval head 60 will encounter resistance which will likely be the obstruction 130 to which the fishing lure 26 is attached. Once this resistance is sensed by the operator, the retriever 40 should be gradually forced forwardly and downwardly to effectuate the ring member 62 encircling the fishing lure 26 and causing the body 80 to pass over the obstruction 130 as illustrated in FIG. 6.

Figure 8:
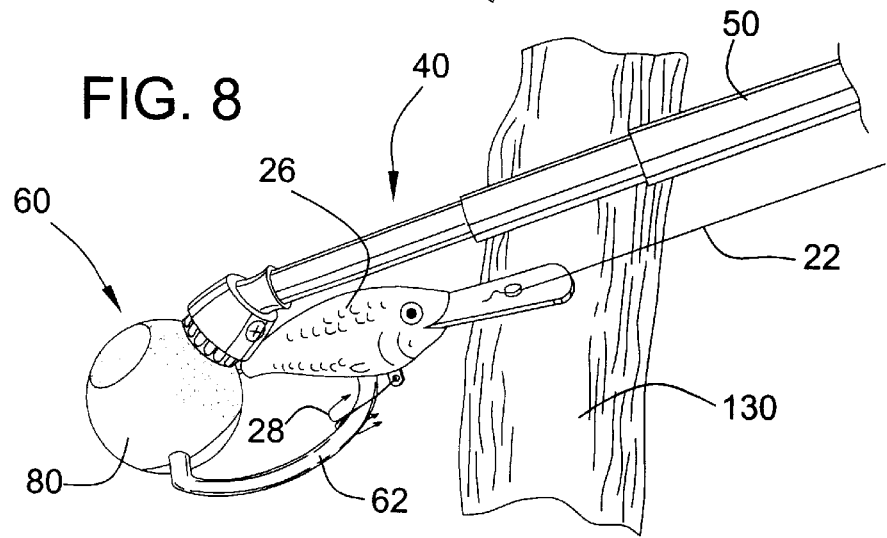

The retriever 40 is then advanced further toward the lure 26 forcing the ring member 62 to pivot rearwardly towards the pole 50 against the rotational biasing force of the torsion spring 120. As the body 80 of the retriever 40 travels over the obstruction 130, the ring member 62 flexibly trails the body 80 while dragging along the surface of the obstruction until the periphery of the ring member 62 reaches the entrapped hook 28. Further advancement of the retriever 40 will urge the hook 28 in a direction opposite its approach into the obstruction 130 thus causing disengagement of the hook 28 from the obstruction 130 as illustrated FIG. 8. Once the lure is free, the retriever 40 may be pulled upwardly and rearwardly out of the water along with the lure 26.

Thus, the present invention provides a retriever that reliably and effectively disengages snagged lures. Not only does the spring biased sliding action of the ring member 62 provide a quick and reliable means of attaching the retriever 40 to the fishing line 22, but also the periphery of the ring member 62 is free of the sharp surfaces that might be susceptible to breaking a fishing line during use. Furthermore, the large central opening 64 of the ring member 62 through which the fishing line 22 passes minimizes the likelihood that the retriever 40 will become entangled with the fishing line 22 while also allowing the ring member 62 to easily encircle fishing lures 26 without the precise manipulation required by many prior art devices.

It will also be appreciated that the flexible trailing effect of the ring member 62 allows the retrieval head 40 to pass over and through obstructions that would otherwise resist the retrieval head 60. Consequently, the present invention is well suited for retrieving lures from locations that may be impenetrable with prior art devices. One type of snag that has proven particularly problematic is lure 26 entanglement in surface brush. However, the retriever 40 of the present invention has been found to effectively maneuver between the branches of this type of brush to reach and extricate the entangled hooks 28 of the fishing lure 26.

Additionally, the large periphery of the ring member 62 allows the retriever 40 to be used from a variety of angles and directions while still engaging and then urging the hooks 28 of the lure 26 in a direction opposite their approach into the obstruction 130.

Accordingly, the retriever 40 of the present invention avoids many of the drawbacks of prior art retrieval devices.

From the foregoing it will be understood that modifications and variations may be effectuated to the disclosed structures—particularly in light of the foregoing teachings—without departing from the scope or spirit of the present invention. As such, no limitation with respect to the specific embodiments described and illustrated herein is intended or should be inferred. Indeed, the following claims are intended to cover all modifications and variations that fall within the scope and spirit of the present invention.

I claim:

1. A device for remotely retrieving a snagged fishing lure attached to a fishing line comprising:

an elongated pole;

a body adapted to be attached to an end of the elongated pole;

a ring member having an outer periphery and being resiliently mounted to the body for pivotal movement with respect thereto, the ring member having an opening in the outer periphery adapted to be selectively accessed to selectively encircle an extended fishing line;

whereby the ring member may be caused to encircle a fishing line attached to the snagged lure and the device caused to track along the line until the periphery of the ring member contacts the fishing lure, whereupon further advancement of the device towards the lure causes the ring member to resiliently pivot relative to the body and urge the lure out of its snagged condition.

2. The invention as in claim 1, wherein the body comprises a channel to which the ring member is mounted.

3. The invent ion as in claim 2, wherein the ring member comprises inwardly extending ends which terminate in opposed relation to form the opening in the periphery of the ring member.

4. The invention as in claim 3, wherein a compression spring is disposed with in the body for providing a lateral biasing force to position the opening in the periphery of the ring member within the body.

5. The invention as in claim 4, wherein the opening in the periphery of the ring member is selectively accessed by sliding the ring member relative to the body in a direction opposite the spring biasing force.

6. The invention as in claim 1, wherein a torsion spring is disposed within the body for providing a rotational biasing force to the ring member.

7. The invention as in claim 6, wherein the torsion spring positions the planar axis of the ring member substantially perpendicular to the longitudinal axis of the pole.

8. The invention as in claim 1, wherein the body is attached to the pole by a connector.

9. The invention as in claim 8, wherein the connector provides swiveling attachment of the pole to the body.

10. The invention as in claim 1, wherein the pole is telescopically extendible.

11. A retrieval head adapted to be attached to an end of an elongated pole for remotely retrieving a snagged fishing lure attached to a fishing line comprising:

a body;

a ring member having an outer periphery and being resiliently mounted to the body for pivotal movement with respect thereto, the ring member having an opening in the outer periphery adapted to be selectively accessed to selectively encircle an extended fishing line;

whereby the ring member may be caused to encircle a fishing line attached to the snagged lure and the retrieval head caused to track along the line until the periphery of the ring member contacts the fishing lure, whereupon further advancement of the retrieval head towards the lure causes the ring member to resiliently pivot relative to the body and urge the lure out of its snagged condition.

* * * * *